United States Patent
Xu et al.

(10) Patent No.: US 12,543,202 B2
(45) Date of Patent: Feb. 3, 2026

(54) SIGNAL TRANSMISSION METHOD TO OPTIMIZE PDCCH MONITORING OF TERMINAL DEVICE AND REDUCE POWER CONSUMPTION

(71) Applicant: GUANGDONG OPPO MOBILE TELECOMMUNICATIONS CORP., LTD., Guangdong (CN)

(72) Inventors: Weijie Xu, Guangdong (CN); Yanan Lin, Guangdong (CN); Zhi Zhang, Guangdong (CN); Wenhong Chen, Guangdong (CN); Zhihua Shi, Guangdong (CN); Jia Shen, Guangdong (CN); Zhenshan Zhao, Guangdong (CN); Cong Shi, Guangdong (CN); Ning Yang, Guangdong (CN); Shukun Wang, Guangdong (CN); Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 634 days.

(21) Appl. No.: 17/146,261

(22) Filed: Jan. 11, 2021

(65) Prior Publication Data
US 2021/0136772 A1    May 6, 2021

Related U.S. Application Data

(63) Continuation of application No. PCT/CN2018/097003, filed on Jul. 25, 2018.

(51) Int. Cl.
*H04W 72/00* (2023.01)
*H04W 24/08* (2009.01)
(Continued)

(52) U.S. Cl.
CPC ........... *H04W 72/53* (2023.01); *H04W 24/08* (2013.01); *H04W 72/0446* (2013.01); *H04W 72/23* (2023.01); *H04W 76/27* (2018.02)

(58) Field of Classification Search
CPC . H04W 72/53; H04W 24/08; H04W 72/0446; H04W 72/23; H04W 76/27;
(Continued)

(56) References Cited

U.S. PATENT DOCUMENTS

| 2014/0119335 A1 | 5/2014 | Wang et al. |
| 2014/0128085 A1* | 5/2014 | Charbit ................ H04W 48/12 455/450 |

(Continued)

FOREIGN PATENT DOCUMENTS

| CN | 102904669 A | 1/2013 |
| CN | 107294897 A | 10/2017 |

(Continued)

OTHER PUBLICATIONS

NTT et al. (NTT Docomo et al: "Summary of key aspects to search space", 3GPP Draft; R1-1718834_SUMMARY_AI_73i2, 3rd Generation Partnership Project (3GPP), Mobile Competence Centre, Oct. 2017).*

(Continued)

*Primary Examiner* — Lakeram Jangbahadur
(74) *Attorney, Agent, or Firm* — PERKINS COIE LLP

(57) ABSTRACT

Embodiments of the present application provides a signal transmission method, a network device, and a terminal device, the method comprising: the network device transmits a first indication signal to the terminal device, the first indication signal being used for determining, by the terminal device, whether to perform downlink control channel monitoring in a search space associated with the first indication signal.

16 Claims, 6 Drawing Sheets

(51) Int. Cl.
*H04W 72/0446* (2023.01)
*H04W 72/23* (2023.01)
*H04W 72/53* (2023.01)
*H04W 76/27* (2018.01)

(58) Field of Classification Search
CPC .......... H04W 52/0235; H04W 52/028; H04W 52/0212; H04L 5/0091; H04L 5/0053; Y02D 30/70
See application file for complete search history.

(56) References Cited

U.S. PATENT DOCUMENTS

| | | | |
|---|---|---|---|
| 2014/0177581 A1* | 6/2014 | Zhang | H04L 1/0038 370/329 |
| 2017/0332359 A1* | 11/2017 | Tsai | H04W 68/02 |
| 2018/0139023 A1 | 5/2018 | Li et al. | |
| 2018/0288715 A1* | 10/2018 | Ye | H04L 5/005 |
| 2018/0324767 A1* | 11/2018 | Manolakos | H04L 5/0044 |

FOREIGN PATENT DOCUMENTS

| | | |
|---|---|---|
| CN | 108282290 A | 7/2018 |
| WO | 2013010301 A1 | 1/2013 |
| WO | 2018128468 A1 | 7/2018 |

OTHER PUBLICATIONS

NTT et al. (NTT Docomo et al: "Summary of key aspects tor search space", 3GPP Draft; R1-1718834_SUMMARY_AI_7312, 3rd Generation Partnership Project (3GPP), Mobile Competence Centre, Oct. 2017).*

Intel (Intel Corporation: "Power Saving Signal for efeMTC", 3GPP Draft; R1-1804694, Apr. 2018).*

Second Office Action of the Japanese application No. 2021-503739, issued on Nov. 29, 2022. 8 pages with English translation.

Second Office Action of the Korean application No. 10-2021-7004036, issued on Feb. 12, 2023. 10 pages with English translation.

Ericsson, "Wake-up signal configurations and procedures for NB-IoT", 3GPP TSG-RAN WG1 Meeting #92 R1-1801489 Athens, Greece, Febr. 26-Mar. 2, 2018. 9 pages.

Qualcomm Incorporated, "Further discussion on WUS configurations and procedures", 3GPP TSG RAN WG1 Meeting #92 R1-1802332 Athens, Greece, Feb. 26-Mar. 2, 2018. 7 pages.

Second Office Action of the Australian application No. 2018433913, issued on Feb. 17, 2023. 4 pages.

International Search Report in the international application No. PCT/CN2018/097003, mailed on Apr. 26, 2019.

Intel Corporation, "Power Saving Signal for efeMTC", 3GPP TSG RAN WG1 #92b R1-1804694, Internet<URL:http://www.3gpp.org/ftp/tsg_ran/WG1_RL1/TSGR1_92b/Docs/R1-1804694. zip>, Apr. 7, 2018.

Samsung, "Discussion on Wake up signal configuration", 3GPP TSG RAN WG1 #93 R1-1806687, Internet<URL:http://www.3gpp.org/ftp/tsg_ran/wG1_RL1/TSGR1_93/Docs/R1-1806687. zip>, May 12, 2018.

First Office Action of the Japanese application No. 2021-503739, issued on Jun. 14, 2022.

Qualcomm Incorporated, R1-1807353, "Remaining issues on control resource set and search space", 3GPP TSG RAN WG1 #93, May 12, 2018.

First Office Action of the Korean application No. 10-2021-7004036, issued on Aug. 5, 2022.

Office Action of the Australian application No. 2018433913, issued on Aug. 24, 2022.

First Office Action of the Indian application No. 202117005163, issued on Jan. 11, 2022. 5 pages with English translation.

First Office Action of the Taiwanese application No. 108126434, issued on Jul. 18, 2022. 13 pages with English translation.

NTT Docomo et al:"Summary of key aspects for search space",3GPP Draft;R1-1718834_SUMMARY_AI_7312, vol. RAN WG1,No. Prague,CZ;Oct. 9, 2017-Oct. 13, 2017 Oct. 9, 2017(Oct. 9, 2017), XP051353314, Retrieved from the Internet: URL:http://www.3gpp.org/ftp/tsg_ran/WG1_RL1/TSGR1_90b/Docs/[retrieved on Oct. 9, 2017]. 22 pages.

Supplementary European Search Report in European application No. 18927808.8, mailed on Jun. 7, 2021. 13 pages.

English translation of the Written Opinion of the International Search Authority in the international application No. PCT/CN2018/097003, mailed on Apr. 26, 2019. 4 pages.

Ericsson, "eMTC power consumption reduction for paging and connected-mode Drx", 3GPP TSG-RAN WG2 #99 R2-1708285, Aug. 21-25, 2017, 8 pages.

Notice of Allowance of the Japanese application No. 2021-503739, issued on Jun. 16, 2023, 5 pages with English translation.

First Office Action of the European application No. 18927808.8, issued on Jun. 16, 2023, 7 pages.

Hearing Notice of the Indian application No. 202117005163, issued on Feb. 28, 2024. 2 pages with English translation.

Second Office Action of the European application No. 18927808.8, issued on Oct. 24, 2025.

\* cited by examiner

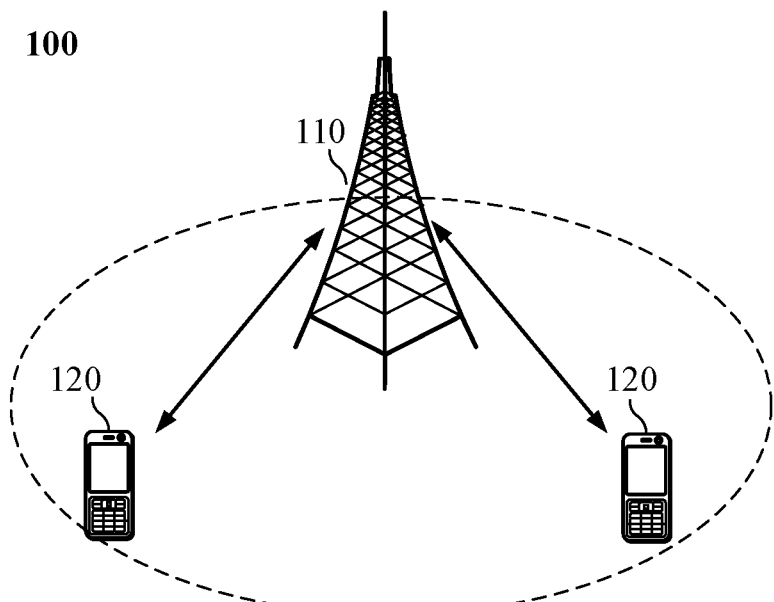

FIG. 1

| A network device sends a first indication signal to a terminal device, the first indication signal being used for the terminal device to determine whether to monitor a downlink control channel in an SS associated with the first indication signal | 201 |

FIG. 2

| A terminal device determines an association relationship between a first indication signal and an SS | 301 |

| The terminal device receives a first indication signal sent by a network device and determines whether to monitor a downlink control channel in an SS associated with the first indication signal based on the first indication signal | 302 |

FIG. 3

SIGNAL TRANSMISSION METHOD TO OPTIMIZE PDCCH MONITORING OF TERMINAL DEVICE AND REDUCE POWER CONSUMPTION

CROSS-REFERENCE TO RELATED APPLICATION

The present application is a continuation of International Application No. PCT/CN2018/097003 filed on Jul. 25, 2018, the disclosure of which is hereby incorporated by reference in its entirety.

TECHNICAL FIELD

Embodiments of the application relate to the technical field of mobile communication, and particularly to a signal transmission method, a network device and a terminal device.

BACKGROUND

A 5th Generation (5G) technology is researched and standardized to endow wireless broadband mobile communication with a higher peak rate, a greater transmission bandwidth and a lower transmission delay. For example, for a 5G terminal device, a working bandwidth is at an order of magnitude of 100 MHz to hundreds of MHz, a data transmission rate is at a Gbps level, and a transmission delay is reduced to an ms level.

However, for a terminal device, there are also brought some problems in implementation and specific uses. For example, broadband radio frequencies and extremely rapid baseband processing for a terminal device increase power consumption of the terminal device relative to a conventional wireless communication system. Consequently, standby time and working time of the 5G terminal device may be influenced, and even the battery life of the terminal device may be influenced.

On the other hand, when a terminal device is in a Radio Resource Control (RRC) connected state, great unnecessary power consumption is generated. For example, the terminal device in the RRC connected state is required to periodically monitor a Physical Downlink Control Channel (PDCCH) Search Space (SS) based on a configuration of the PDCCH SS, but a network actually initiates scheduling to the terminal device only in a small number of PDCCH transmission slots, and the terminal device is not scheduled in plenty of other time, namely no PDCCH for the terminal device is transmitted.

Therefore, how to optimize PDCCH monitoring of a terminal device and reduce unnecessary power consumption in a PDCCH receiving process of the terminal device needs to be solved.

SUMMARY

The embodiments of the application provide a signal transmission method, a network device and a terminal device.

The embodiments of the application provide a signal transmission method, which may include the following operation.

A network device transmits a first indication signal to a terminal device, the first indication signal is used for the terminal device to determine whether to monitor a downlink control channel in an SS associated with the first indication signal.

The embodiments of the application provide a signal transmission method, which may include the following operations.

A terminal device determines an association relationship between a first indication signal and an SS. The terminal device receives a first indication signal transmitted by a network device and determines whether to monitor a downlink control channel in an SS associated with the first indication signal based on the first indication signal.

The embodiments of the application provide a network device, which may include a transceiver, a processor and a memory. The memory is used to store computer programs, and the processor is configured to call and run the computer programs stored in the memory to transmit a first indication signal to a terminal device via the transceiver, the first indication signal is used for the terminal device to determine whether to monitor a downlink control channel in a Search Space (SS) associated with the first indication signal.

The embodiments of the application provide a terminal device, which may include a transceiver, a processor and a memory. The memory is used to store computer programs, and the processor is configured to call and run the computer programs stored in the memory to determine an association relationship between a first indication signal and a Search Space (SS) and receive, via the transceiver, a first indication signal transmitted by a network device and determine whether to monitor a downlink control channel in the SS associated with the first indication signal based on the first indication signal.

BRIEF DESCRIPTION OF THE DRAWINGS

The drawings described herein are adopted to provide a further understanding to the application and form a part of the application. Schematic embodiments of the application and descriptions thereof are adopted to explain the application and not intended to form improper limits to the application. In the drawings:

FIG. 1 is an architecture diagram of a communication system according to an embodiment of the application.

FIG. 2 is a first flowchart of a signal transmission method according to an embodiment of the application.

FIG. 3 is a second flowchart of a signal transmission method according to an embodiment of the application.

DETAILED DESCRIPTION

Figure 4:
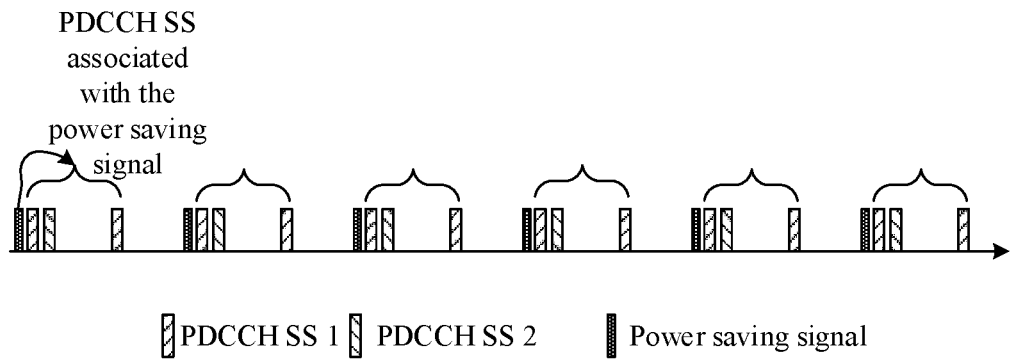
FIG. 4 is a schematic diagram of association of a power saving signal and two PDCCH SSs according to an embodiment of the application.

The technical solutions in the embodiments of the application will be described below in combination with the drawings in the embodiments of the application. It is apparent that the described embodiments are not all embodiments but part of embodiments of the application. All other embodiments obtained by those of ordinary skill in the art based on the embodiments in the application without creative work shall fall within the scope of protection of the application.

The technical solutions of the embodiments of the application may be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Exemplarily, a communication system 100 that the embodiments of the application are applied to is shown in FIG. 1. The communication system 100 may include a network device 110, and the network device 110 may be a device communicating with a terminal device 120 (or called a communication terminal and a terminal). The network device 110 may provide communication coverage for a specific geographical region and may communicate with a terminal device located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal device 120 within the coverage of the network device 110. A "terminal device" used herein includes, but not limited to, a device arranged to receive/transmit a communication signal through a wired line connection, for example, through Public Switched Telephone Network (PSTN), Digital Subscriber Line (DSL), digital cable and direct cable connections, and/or another data connection/network and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device arranged to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform Device to Device (D2D) communication.

Optionally, the 5G system or the 5G network may also be called a New Radio (NR) system or an NR network.

A network device and two terminal devices are exemplarily shown in FIG. 1. Optionally, the communication system 100 may include multiple network devices and another number of terminal devices may be included in coverage of each network device. There are no limits made thereto in the embodiments of the application.

Optionally, the communication system 100 may further include another network entity such as a network controller and a mobility management entity. There are no limits made thereto in the embodiments of the application.

It is to be understood that a device with a communication function in the network/system in the embodiments of the application may be called a communication device. For example, for the communication system 100 shown in FIG. 1, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the application.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 2 is a first flowchart of a signal transmission method according to an embodiment of the application. As shown in FIG. 2, the signal transmission method includes the following step.

In 201, a network device transmits a first indication signal to a terminal device, the first indication signal is used for the terminal device to determine whether to monitor a downlink control channel in an SS associated with the first indication signal.

In the embodiment of the application, the network device is a base station, for example, a gNB in 5G and an eNB in LTE.

In the embodiment of the application, the terminal device may be any device capable of communicating with the network device, such as a mobile phone, a tablet computer and a vehicle terminal device.

In the embodiment of the application, the SS is used to transmit a downlink control channel (for example, a PDCCH), the description SS may be recorded as PDCCH SS, and the description PDCCH SS may be understood as SS.

The terminal device monitors the PDCCH in the PDCCH SS. Configuration information of the PDCCH SS is usually notified to the terminal by the network device through a RRC signaling, and the network device may configure configuration information of one or more PDCCH SSs for the terminal device. Herein, the configuration information of an SS includes the following information:

- a search Identifier (ID): indicating an ID of the SS;
- controlResourceSetId: indicating an ID of configuration information of a control resource set associated with the SS, which configures a time-frequency resource of the PDCCH SS;
- a period of slots on which the monitoring is performed and an offset of the slot in a period: periods presently supported by NR include 1, 2, 4, 5, 8, 10, 16, 20, 40, 80, 160, 320, 640, 1,280 and 2,560 slots;
- a duration: indicating the number of slots, on which the monitoring is performed continuously, in a PDCCH SS period;
- monitoringSymbolsWithinSlot: indicating specific symbols, on which PDCCH monitoring is performed, in the PDCCH monitoring slot;
- PDCCH candidates: indicating configuration information of a PDCCH candidate; and
- a type of the SS: indicating whether the PDCCH SS is a common SS or a UE-specific space.

In the embodiment of the application, an association relationship between the first indication signal and the SS is configured by the network device; or, the association relationship between the first indication signal and the SS is predefined. Under a case that the association relationship between the first indication signal and the SS is configured by the network device, the network device transmits first configuration information to the terminal device, the first configuration information includes the association relationship between the first indication signal and the SS.

Herein, the first indication signal may also be called a power saving signal, and the network device transmits an association relationship between a power saving signal and a PDCCH SS. Herein, the association relationship may also be called a mapping relationship or a corresponding relationship.

In an implementation mode, the network device transmits the first configuration information to the terminal device through a RRC dedicated signaling or a system broadcast message.

In the embodiment of the application, the SS associated with the first indication signal includes a common SS and/or a UE-specific SS.

In the embodiment of the application, the association relationship between the first indication signal and the SS includes at least one of:

- an association relationship between the first indication signal and one or multiple SSs, the multiple SSs belongs to different SS sets;
- an association relationship between the first indication signal and one or multiple SS periods in an SS set;
- an association relationship between the first indication signal and a slot, where an SS is located, in an SS period in an SS set;
- an association relationship between the first indication signal and a downlink control channel monitoring symbol in a slot, where an SS is located, in an SS period in an SS set; and
- an association relationship between the first indication signal and an SS in a first time window, the first time window have a first time length and a time-domain range of the first time window is determined based on a time at which the first indication signal is sent and the first time length. Furthermore, the first indication signal periodically appears in time, and a value of the first time length is the same as a value of a period of the first indication signals.

Furthermore, the association relationship between the first indication signal and the SS periodically exists in a time domain.

For example, multiple first SSs (SS1) periodically appear in time to form a first SS set, multiple second SSs (SS2) periodically appear in time to form a second SS set, a period corresponding to the SS1 is different from a period corresponding to the SS2, and the SS associated with the first indication signal includes one SS1 and one SS2. If a time-domain position of the first indication signal is t1, a time-domain position of the SS1 is t2 and a time-domain position of the SS2 is t3, the SS associated with the first indication signal at t1 is the SS1 at t2 and the SS2 at t3, and furthermore, the first indication signal, the SS1 and the SS2 periodically appear in the time domain.

For example, multiple first SSs (SS1) periodically appear in time to form a first SS set, and the SS associated with the first indication signal includes two SS1 periods (i.e., two SSs1). If a time-domain position of the first indication signal is t1, a time-domain position of the first SS1 is t2 and a time-domain position of the second SS1 is t3, the SS associated with the first indication signal at t1 is the SS1 at t2 and the SS1 at t3, and furthermore, the first indication signal, the SS1 and the SS1 periodically appear in the time domain.

For example, multiple first SSs (SS1) periodically appear in time to form a first SS set, and the SS associated with the first indication signal includes a slot 1 and slot 2, where the SS1 is located, in an SS1 period. If a time-domain position of the first indication signal is t1, a time-domain position of the slot 1 is t2 and a time-domain position of the slot 2 is t3, the SS associated with the first indication signal at t1 is the slot 1 at t2 and the slot 2 at t3, and furthermore, the first indication signal, the slot 1 and the slot 2 periodically appear in the time domain.

For example, multiple first SSs (SS1) periodically appear in time to form a first SS set, and the SS associated with the first indication signal includes a PDCCH monitoring symbol 1 in a slot 1, where an SS1 is located, in an SS1 period. If a time-domain position of the first indication signal is t1 and a time-domain position of the symbol 1 is t2, the SS associated with the first indication signal at t1 is the symbol 1 at t2, and furthermore, the first indication signal and the symbol 1 periodically appear in the time domain.

For example, a resource capable of transmitting the first indication signal periodically appears in time, and the SS associated with the first indication signal is in a first time window of which a time length is s. There is made such a hypothesis that a time at which the first indication signal is sent is t1 and a time-domain range of the first time window is [t1+k, t1+k+s], where k is greater than 0. It is to be noted that units of t1, k and s are required to be a same unit. The unit may be an absolute time unit (for example, ms) and may also be a time-domain unit (for example, a slot, a symbol and a short Transmission Time Interval (sTTI)). Similarly, in a next period, a time at which the first indication signal is sent is t2 and the time-domain range of the first time window is [t2+k, t2+k+s]. Herein, the period of the first indication signals appearing in time domain is T=t2−t1, and a value of s is the same as a value of T. It should be understood that first time windows corresponding to different periods may be partially overlapping and may also be completely non-overlapping.

In the embodiment of the application, starting time for the association relationship between the first indication signal and the SS in the time domain is configured by the network device; or, the starting time for the association relationship between the first indication signal and the SS in the time domain is predefined.

Herein, the first indication signal and the SS associated with the first indication signal forms a period and periodically appears in the time domain, and a position of a first period appearing in the time domain is the starting time for the association relationship between the first indication signal and the SS in the time domain.

In the embodiment of the application, since the association relationship between the first indication signal and the SS has been determined, namely specific positions where the first indication signal is capable of being transmitted are determined, the network device may only transmit the first indication signal to the terminal device at these positions where the first indication signal is capable of being transmitted, and of course, the network device may also not transmit the first indication signal at the positions where the first indication signal is capable of being transmitted. It can be seen that the network device, when transmitting the first indication signal, is required to transmit the first indication signal based on the association relationship.

For example, if it is determined based on the association relationship that the positions where the first indication signal is capable of being transmitted are t1, t4, t7, t10 . . . , the network device may select whether to transmit the first indication signal at these positions. The terminal device, after receiving the first indication signal transmitted by the network device, may determine whether to monitor a downlink control channel in the SS associated with the first indication signal based on information indicated by the first indication signal. For example, the terminal device receives the first indication signal transmitted by the network device at a position t1, the first indication signal at the position t1 forms an association relationship with SSs at positions t2 and t3. If the first indication signal indicates that downlink control channel monitoring is required to be performed in the SS associated with the first indication signal, the terminal device may monitor PDCCHs at the positions t2 and t3. If the first indication signal indicates that downlink control channel monitoring is not required to be performed in the SS associated with the first indication signal, the terminal device does not monitor the PDCCH at the positions t2 and t3.

According to the technical solution of the embodiment of the application, the terminal device may determine the association relationship between the first indication signal and the PDCCH SS, and furthermore, the first indication signal is associated with one or more PDCCH SSs, and/or one or more PDCCH SS periods, and/or one or more PDCCH slots and/or one or more PDCCH symbols, so that one first indication signal corresponds to one or more PDCCH monitoring positions, which is favorable for reducing the overhead of the first indication signal, simultaneously narrows a PDCCH monitoring range and reduces the power consumption of the terminal device.

FIG. 3 is a second flowchart of a signal transmission method according to an embodiment of the application. As shown in FIG. 3, the signal transmission method includes the following steps.

In 301, a terminal device determines an association relationship between a first indication signal and an SS.

In the embodiment of the application, the terminal device may be any device capable of communicating with the network device, such as a mobile phone, a tablet computer and a vehicle terminal device.

In the embodiment of the application, the network device is a base station, for example, a gNB in 5G and an eNB in LTE.

In the embodiment of the application, the SS is used to transmit a downlink control channel (for example, a PDCCH), the description SS may be recorded as PDCCH SS, and the description PDCCH SS may be understood as SS.

The terminal device monitors the PDCCH in the PDCCH SS. Configuration information of the PDCCH SS is usually notified to the terminal by the network device through a RRC signaling, and the network device may configure configuration information of one or more PDCCH SSs for the terminal device. Herein, the configuration information of an SS can be understood with reference to the descriptions on the network device side.

In the embodiment of the application, the association relationship between the first indication signal and the SS is configured by the network device; or, the association relationship between the first indication signal and the SS is predefined. In a case that the association relationship between the first indication signal and the SS is configured by the network device, the terminal device receives first configuration information transmitted by the network device, the first configuration information includes the association relationship between the first indication signal and the SS.

Herein, the first indication signal may also be called a power saving signal, and the network device transmits an association relationship between a power saving signal and a PDCCH SS to a terminal device. Herein, the association relationship may also be called a mapping relationship or a corresponding relationship.

In an implementation mode, the terminal device receives the first configuration information transmitted by the network device through a RRC dedicated signaling or a system broadcast message.

In the embodiment of the application, the SS associated with the first indication signal includes a common SS and/or a UE-specific SS.

In the embodiment of the application, the association relationship between the first indication signal and the SS includes at least one of:

an association relationship between the first indication signal and one or multiple SSs, the multiple SSs belongs to different SS sets;

an association relationship between the first indication signal and one or more SS periods in an SS set;

an association relationship between the first indication signal and a slot, where an SS is located, in an SS period in an SS set;

an association relationship between the first indication signal and a downlink control channel monitoring symbol in a slot, where an SS is located, in an SS period in an SS set; and an association relationship between the first indication signal and an SS in a first time window, the first time window has a first time length and a time-domain range of the first time window is determined based on a time at which the first indication signal is sent and the first time length. Furthermore, the first indication signal periodically appears in time, and a value of the first time length is the same as a value of a period of the first indication signals.

Furthermore, the association relationship between the first indication signal and the SS periodically exists in a time domain.

For example, multiple first SSs (SS1) periodically appear in time to form a first SS set, multiple second SSs (SS2) periodically appear in time to form a second SS set, a period corresponding to the SS1 is different from a period corresponding to the SS2, and the SS associated with the first indication signal includes one SS1 and one SS2. If a time-domain position of the first indication signal is t1, a time-domain position of the SS1 is t2 and a time-domain position of the SS2 is t3, the SS associated with the first indication signal at t1 is the SS1 at t2 and the SS2 at t3, and furthermore, the first indication signal, the SS1 and the SS2 periodically appear in the time domain.

For example, multiple first SSs (SS1) periodically appear in time to form a first SS set, and the SS associated with the first indication signal includes two SS1 periods (i.e., two SSs1). If a time-domain position of the first indication signal is t1, a time-domain position of the first SS1 is t2 and a time-domain position of the second SS1 is t3, the SS associated with the first indication signal at t1 is the SS1 at t2 and the SS1 at t3, and furthermore, the first indication signal, the SS1 and the SS1 periodically appear in the time domain.

For example, multiple first SSs (SS1) periodically appear in time to form a first SS set, and the SS associated with the first indication signal includes a slot 1 and slot 2, where the SS1 is located, in an SS1 period. If a time-domain position of the first indication signal is t1, a time-domain position of the slot 1 is t2 and a time-domain position of the slot 2 is t3, the SS associated with the first indication signal at t1 is the slot 1 at t2 and the slot 2 at t3, and furthermore, the first indication signal, the slot 1 and the slot 2 periodically appear in the time domain.

For example, multiple first SSs (SS1) periodically appear in time to form a first SS set, and the SS associated with the first indication signal includes a PDCCH monitoring symbol 1 in a slot 1, where the SS1 is located, in an SS1 period. If a time-domain position of the first indication signal is t1 and a time-domain position of the symbol 1 is t2, the SS associated with the first indication signal at t1 is the symbol 1 at t2, and furthermore, the first indication signal and the symbol 1 periodically appear in the time domain.

For example, a resource capable of transmitting the first indication signal periodically appears in time, and the SS associated with the first indication signal is in a first time window of which a time length is s. There is made such a hypothesis that time when the first indication signal appears is t1 and a time-domain range of the first time window is [t1+k, t1+k+s], where k is greater than 0. It is to be noted that units of t1, k and s are required to be a same unit and the unit may be an absolute time unit (for example, ms) and may also be a time-domain unit (for example, a slot, a symbol and a sTTI). Similarly, in a next period, time when the first indication signal appears is t2 and the time-domain range of the first time window is [t2+k, t2+k+s]. Herein, a period of appearance of the first indication signals in time is T=t2−t1, and a value of s is the same as a value of T. It should be understood that first time windows corresponding to different periods may be partially overlapping and may also be completely non-overlapping.

In the embodiment of the application, starting time for the association relationship between the first indication signal and the SS in the time domain is configured by the network device; or, the starting time for the association relationship between the first indication signal and the SS in the time domain is predefined.

Herein, the first indication signal and the SS associated with the first indication signal form a period and periodically appears in the time domain, and a position of a first period appearing in the time domain is the starting time for the association relationship between the first indication signal and the SS in the time domain.

In 302, the terminal device receives a first indication signal transmitted by a network device and determines whether to monitor a downlink control channel in an SS associated with the first indication signal based on the first indication signal.

In the embodiment of the application, since the association relationship between the first indication signal and the SS has been determined, namely specific positions where the first indication signal is capable of being transmitted are determined, the network device may only transmit the first indication signal to the terminal device at these positions where the first indication signal is capable of being transmitted, and of course, the network device may also not transmit the first indication signal at the positions where the first indication signal is capable of being transmitted. It can be seen that the network device, when transmitting the first indication signal, is required to transmit the first indication signal based on the association relationship.

The terminal device, after receiving the first indication signal transmitted by the network device, may determine whether to monitor a downlink control channel in the SS associated with the first indication signal based on an indication of the first indication signal. For example, the terminal device receives the first indication signal transmitted by the network device at a position t1, the first indication signal at the position t1 forms an association relationship with SSs at positions t2 and t3. If the first indication signal indicates that downlink control channel monitoring is required to be performed in the SS associated with the first indication signal, the terminal device may monitor the PDCCH at the positions t2 and t3. If the first indication signal indicates that downlink control channel monitoring is not required to be performed in the SS associated with the first indication signal, the terminal device does not monitor the PDCCH at the positions t2 and t3.

According to the technical solution of the embodiment of the application, the terminal device may determine the association relationship between the first indication signal and the PDCCH SS, and furthermore, the first indication signal is associated with one or more PDCCH SSs, and/or one or more PDCCH SS periods, and/or one or more PDCCH slots and/or one or more PDCCH symbols, so that one first indication signal corresponds to one or more PDCCH monitoring positions, which is favorable for reducing the overhead of the first indication signal, simultaneously narrows a PDCCH monitoring range and reduces the power consumption of the terminal device.

The technical solutions of the embodiments of the application will be exemplarily described below in combination with specific application examples. In the following embodiments, the first indication signal is called a power saving signal, and the SS is called a PDCCH SS.

Application Example 1: An Association Relationship Between a Power Saving Signal and One or Multiple PDCCH SSs One power saving signal may be associated with one PDCCH SS and may also be associated with multiple PDCCH SSs. Referring to FIG. 4, the power saving signal is associated with two PDCCH SSs, i.e., a PDCCH SS 1 and a PDCCH SS 2 respectively. It can be seen from the figure that the power saving signal that is periodically transmitted is associated with both PDCCH SS 1 and PDCCH SS 2 that periodically appear, a time period of the PDCCH SS 2 is twice a time period of the PDCCH SS 1.

Figure 5:
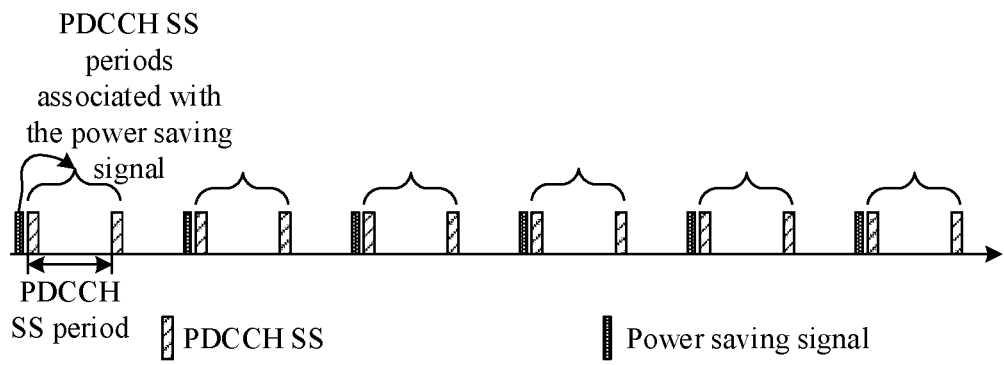
FIG. 5 is a schematic diagram of association of a power saving signal and two PDCCH SS periods according to an embodiment of the application.
Figure 6:
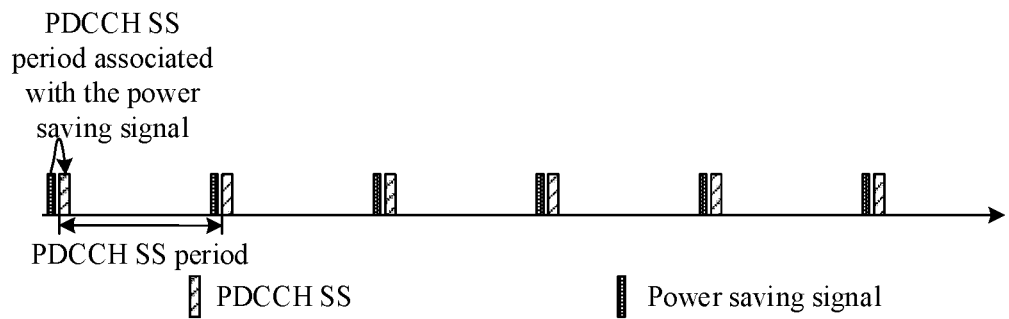
FIG. 6 is a schematic diagram of association of a power saving signal and one PDCCH SS period according to an embodiment of the application.

Application Example 2: An Association Relationship Between a Power Saving Signal and One or Multiple PDCCH SS Periods One power saving signal may be associated with one PDCCH SS period and may also be associated with multiple PDCCH SS periods. Referring to FIG. 5, the power saving signal is associated with two PDCCH SS periods. Referring to FIG. 6, the power saving signal is associated with one PDCCH SS period.

Figure 7:
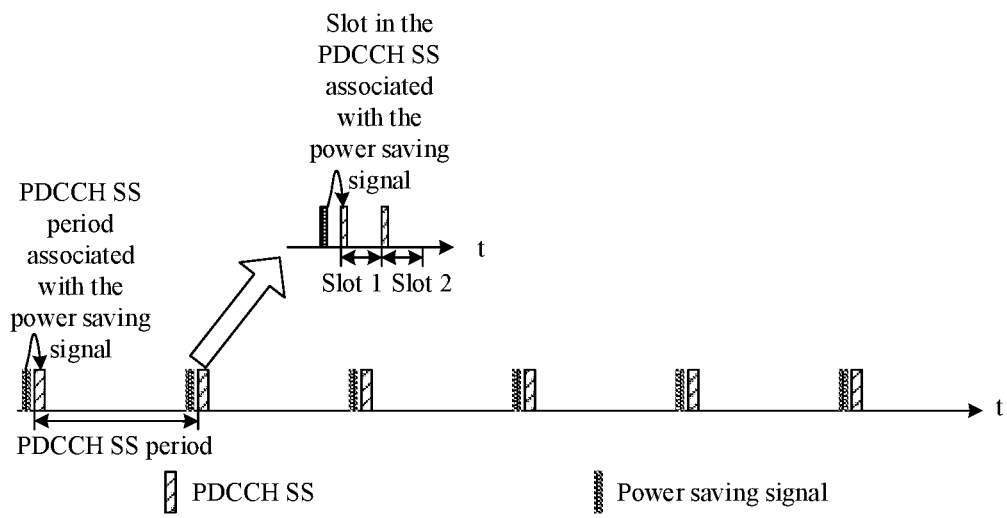
FIG. 7 is a schematic diagram of association of a power saving signal and one PDCCH slot according to an embodiment of the application.
Figure 8:
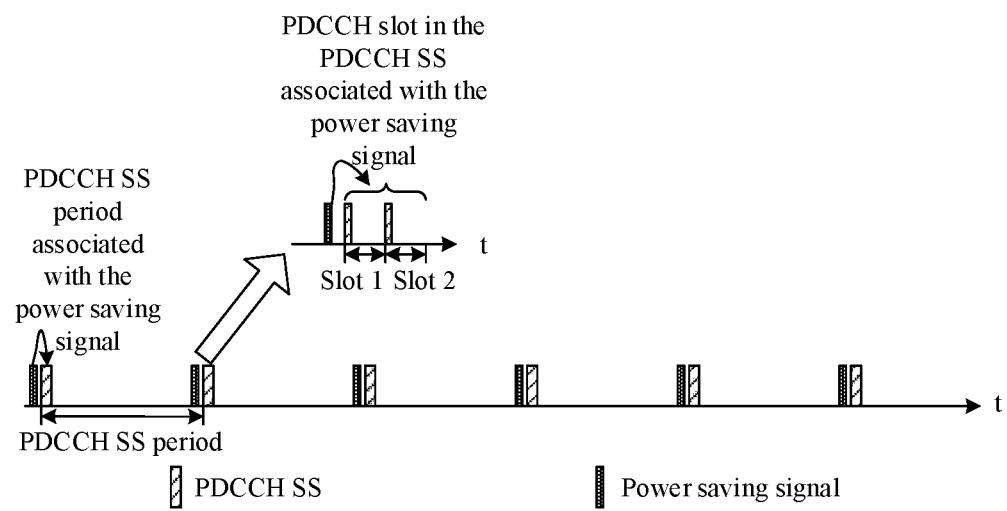
FIG. 8 is a schematic diagram of association of a power saving signal and two PDCCH slots according to an embodiment of the application.

Application Example 3: An Association Relationship Between a Power Saving Signal and a Slot (Called a PDCCH Slot) Occupied by a PDCCH SS One power saving signal may be associated with one PDCCH slot and may also be associated with multiple PDCCH slots. Referring to FIG. 7, the power saving signal is associated with one PDCCH slot. Referring to FIG. 8, the power saving signal is associated with two PDCCH slots.

Figure 9:
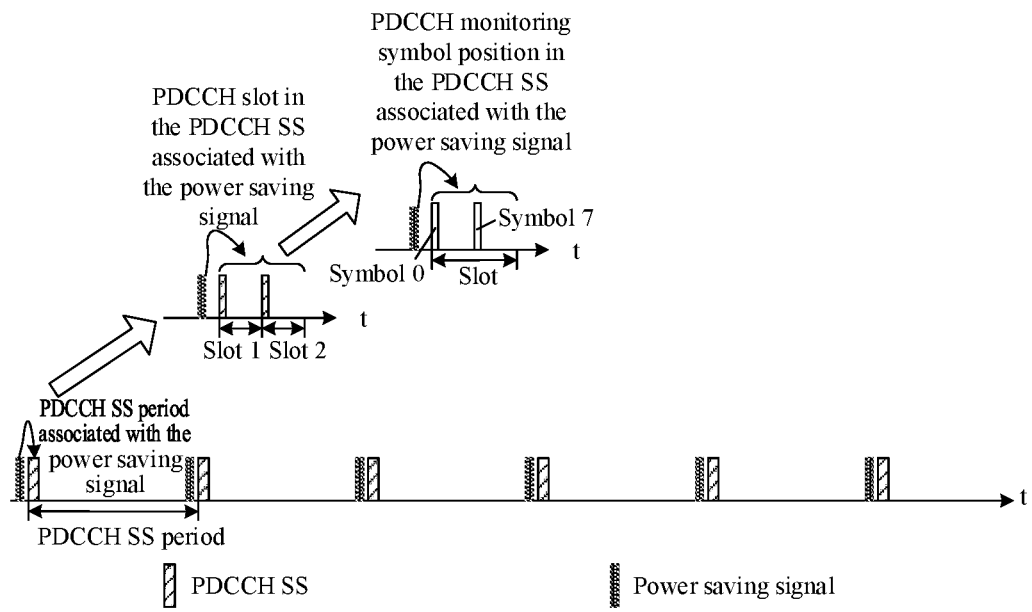
FIG. 9 is a schematic diagram of association of a power saving signal and two PDCCH monitoring symbols according to an embodiment of the application.

Application Example 4: An Association Relationship Between a Power Saving Signal and a PDCCH Monitoring Symbol Position in a Slot Occupied by a PDCCH SS The power saving signal may be associated with one PDCCH monitoring symbol position in the slot occupied by the PDCCH SS and may also be associated with multiple PDCCH monitoring symbol positions. Referring to FIG. 9, the power saving signal is associated with two PDCCH monitoring symbol positions (a symbol 0 and a symbol 7).

Application Example 5

The association relationship between the power saving signal and the PDCCH SS may be implemented in combination with any two or more of application example 1 to application example 4.

For example, the power saving signal is associated with two PDCCH SSs, i.e., the PDCCH SS 1 and the PDCCH SS 2 respectively, and the power saving signal is associated with two PDCCH SS periods of the PDCCH SS 1 and is associated with one PDCCH SS period of the PDCCH SS 2.

For another example, the power saving signal is associated with two PDCCH SSs, i.e., the PDCCH SS 1 and the PDCCH SS 2 respectively, and the power saving signal is associated with two PDCCH SS periods of the PDCCH SS 1 and is associated with two PDCCH slots of the PDCCH SS 2.

For another example, the power saving signal is associated with three PDCCH SSs, i.e., the PDCCH SS 1, the PDCCH SS 2 and a PDCCH SS 3 respectively, and the power saving signal is associated with two PDCCH SS periods of the PDCCH SS 1, associated with one PDCCH slot of the PDCCH SS 2 and associated with two PDCCH monitoring symbols of the PDCCH SS 3.

Application Example 6: An Association Between a Power Saving Signal and a PDCCH SS in a First Time Window For example, a resource capable of transmitting the first indication signal periodically appears in time, and the SS associated with the first indication signal is in the first time window of which a time length is s. There is made such a hypothesis that a time at which the first indication signal is sent is t1 and a time-domain range of the first time window is [t1+k, t1+k+s], where k is greater than 0. It is to be noted that units of t1, k and s are required to be a same unit. The unit may be an absolute time unit (for example, ms) and may also be a time-domain unit (for example, a slot, a symbol and an sTTI. Similarly, in a next period, a time at which the first indication signal is sent is t2 and the time-domain range of the first time window is [t2+k, t2+k+s]. Herein, a period of the first indication signals appearing in time domain is T=t2−t1, and a value of s is the same as a value of T. It should be understood that first time windows corresponding to different periods may be partially overlapping and may also be completely non-overlapping.

There is made such a hypothesis that the period of the first indication signals is 10 ms, and the SS associated with the first indication signal is in the first time window of which the time length is 10 ms; in a first period, a time at which the first indication signal is sent is a slot 0, and the time-domain range of the first time window is slots [1, 11]; in a second period, a time at which the first indication signal is sent is 10, and the time-domain range of the first time window is [11, 21]; and so on.

Application Example 7: A Monitoring Behavior of UE in an Associated PDCCH SS

When a function of a power saving signal is turned on, the UE receives an indication of the power saving signal, an acting range of the indication is the PDCCH SS associated with the power saving signal. Specifically, when the UE is required to monitor a PDCCH based on the indication of the power saving signal, the UE monitors the PDCCH in a PDCCH SS associated with the power saving signal. When the UE is not required to monitor the PDCCH based on the indication of the power saving signal, the UE does not monitor the PDCCH in the PDCCH SS associated with the power saving signal.

When the function of the power saving signal is turned off, even though the network configures an association relationship between the power saving signal and the PDCCH SS, the UE ignores the association relationship and performs PDCCH monitoring normally according to configurations of PDCCH SSs.

Figure 10:
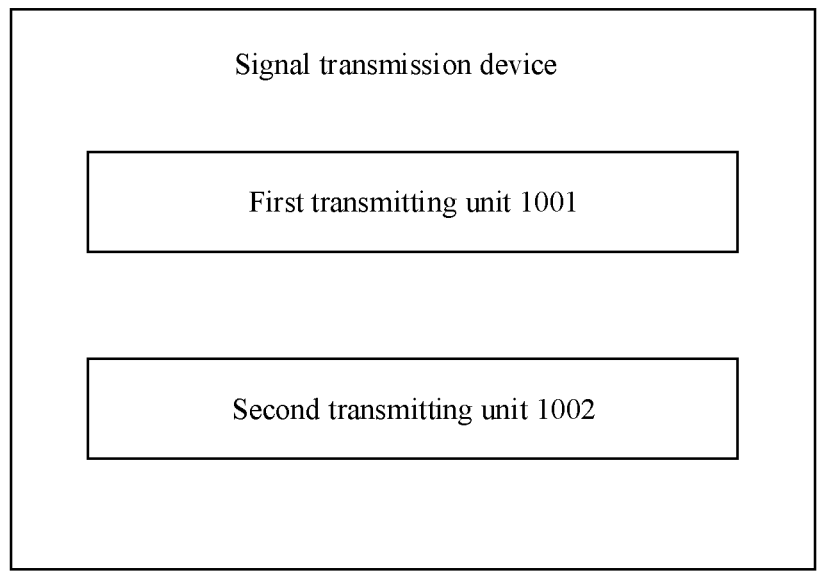
FIG. 10 is a first structure composition diagram of a signal transmission apparatus according to an embodiment of the application.

FIG. 10 is a first structure composition diagram of a signal transmission apparatus according to an embodiment of the application. As shown in FIG. 10, the signal transmission apparatus includes a first transmitting unit 1001.

The first transmitting unit 1001 is configured to transmit a first indication signal to a terminal device, the first indication signal is used for the terminal device to determine whether to monitor a downlink control channel in an SS associated with the first indication signal.

In an implementation mode, an association relationship between the first indication signal and the SS includes at least one of:
  an association relationship between the first indication signal and one or multiple SSs, the multiple SSs belong to different SS sets;
  an association relationship between the first indication signal and one or more SS periods in an SS set;
  an association relationship between the first indication signal and a slot, where an SS is located, in an SS period in an SS set;
  an association relationship between the first indication signal and a downlink control channel monitoring symbol in a slot, where an SS is located, in an SS period in an SS set; and
  an association relationship between the first indication signal and an SS in a first time window, the first time window has a first time length and a time-domain range of the first time window is determined based on a time at which the first indication signal is sent and the first time length. Furthermore, the first indication signal periodically appears in time, and a value of the first time length is the same as a value of a period of the first indication signals.

In an implementation mode, the association relationship between the first indication signal and the SS periodically exists in a time domain.

In an implementation mode, starting time for the association relationship between the first indication signal and the SS in the time domain is configured by a network device; or,
  the starting time for the association relationship between the first indication signal and the SS in the time domain is predefined.

In an implementation mode, the association relationship between the first indication signal and the SS is configured by the network device; or,
  the association relationship between the first indication signal and the SS is predefined.

In a case that the association relationship between the first indication signal and the SS is configured by the network device, the device further includes a second transmitting unit 1002.

The second transmitting unit 1002 is configured to transmit first configuration information to the terminal device, the first configuration information includes the association relationship between the first indication signal and the SS.

In an implementation mode, the second transmitting unit 1002 is configured to transmit the first configuration information to the terminal device through a RRC dedicated signaling or a system broadcast message.

In an implementation mode, the SS associated with the first indication signal includes a common SS and/or a UE-specific SS.

It is understood by those skilled in the art that the related descriptions about the signal transmission apparatus of the embodiments of the application may be understood with reference to the related descriptions about the signal transmission method of the embodiments of the application.

Figure 11:
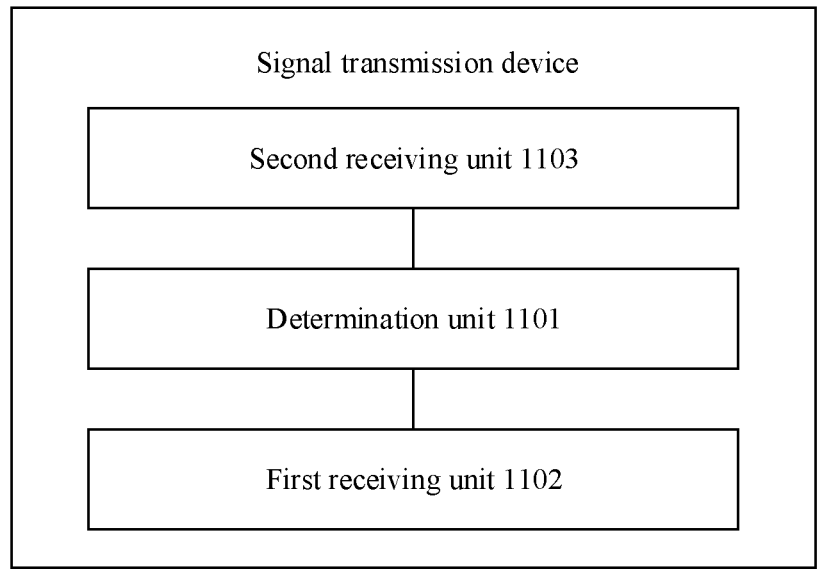
FIG. 11 is a second structure composition diagram of a signal transmission apparatus according to an embodiment of the application.
Figure 12:
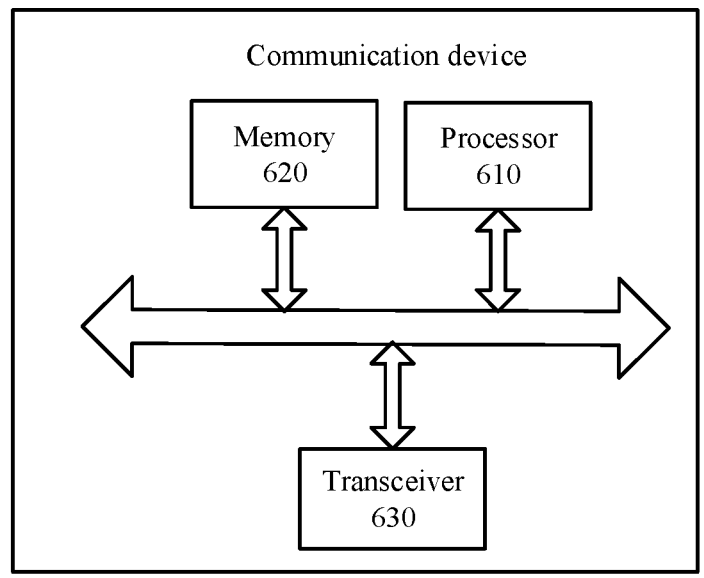
FIG. 12 is a schematic structure diagram of a communication device according to an embodiment of the application.

FIG. 11 is a second structure composition diagram of a signal transmission apparatus according to an embodiment of the application. As shown in FIG. 12, the signal transmission apparatus includes a determination unit 1101 and a first receiving unit 1102.

The determination unit 1101 is configured to determine an association relationship between a first indication signal and an SS.

The first receiving unit 1102 is configured to receive a first indication signal transmitted by a network device and determine whether to monitor a downlink control channel in an SS associated with the first indication signal based on the first indication signal.

In an implementation mode, the association relationship between the first indication signal and the SS includes at least one of:
  an association relationship between the first indication signal and one or multiple SSs, the multiple SSs belong to different SS sets;
  an association relationship between the first indication signal and one or more SS periods in an SS set;
  an association relationship between the first indication signal and a slot, where an SS is located, in an SS period in an SS set;
  an association relationship between the first indication signal and a downlink control channel monitoring symbol in a slot, where an SS is located, in an SS period in an SS set; and
  an association relationship between the first indication signal and an SS in a first time window, the first time window has a first time length and a time-domain range of the first time window is determined based on a time at which the first indication signal is sent and the first time length. Furthermore, the first indication signal periodically appears in time, and a value of the first time length is the same as a value of a period of the first indication signals.

In an implementation mode, the association relationship between the first indication signal and the SS periodically exists in a time domain.

In an implementation mode, starting time for the association relationship between the first indication signal and the SS in the time domain is configured by the network device; or,
  the starting time for the association relationship between the first indication signal and the SS in the time domain is predefined.

In an implementation mode, the association relationship between the first indication signal and the SS is configured by the network device; or,
  the association relationship between the first indication signal and the SS is predefined.

In an implementation mode, in a case that the association relationship between the first indication signal and the SS is configured by the network device, the device further includes a second receiving unit 1103.

The second receiving unit 1103 is configured to receive first configuration information transmitted by the network device, the first configuration information includes the association relationship between the first indication signal and the SS.

In an implementation mode, the second receiving unit 1103 is configured to receive the first configuration information transmitted by the network device through a RRC dedicated signaling or a system broadcast message.

In an implementation mode, the SS associated with the first indication signal includes a common SS and/or a UE-specific SS.

It is understood by those skilled in the art that the related descriptions about the signal transmission apparatus of the embodiments of the application may be understood with reference to the related descriptions about the signal transmission method of the embodiments of the application.

FIG. 12 is a schematic structure diagram of a communication device 600 according to an embodiment of the application. The communication device may be a terminal device and may also be a network device. The communication device 600 shown in FIG. 12 includes a processor 610, and the processor 610 may call and run computer programs in a memory to implement the method in the embodiments of the application.

Optionally, as shown in FIG. 12, the communication device 600 may further include the memory 620. The processor 610 may call and run the computer programs in the memory 620 to implement the method in the embodiments of the application.

The memory 620 may be an independent device independent of the processor 610 and may also be integrated into the processor 610.

Optionally, as shown in FIG. 12, the communication device 600 may further include a transceiver 630, and the processor 610 may control the transceiver 630 to communicate with another device, specifically transmitting information or data to the other device or receiving information or data transmitted by the other device.

The transceiver 630 may include a transmitter and a receiver. The transceiver 630 may further include antennae, and the number of the antennae may be one or more.

Optionally, the communication device 600 may specifically be a network device of the embodiment of the application, and the communication device 600 may implement corresponding flows implemented by the network device in each method of the embodiments of the application. For simplicity, elaborations are omitted herein.

Optionally, the communication device 600 may specifically be the mobile terminal/terminal device of the embodiments of the application, and the communication device 600 may implement corresponding flows implemented by the mobile terminal/terminal device in each method of the embodiments of the application. For simplicity, elaborations are omitted herein.

Figure 13:
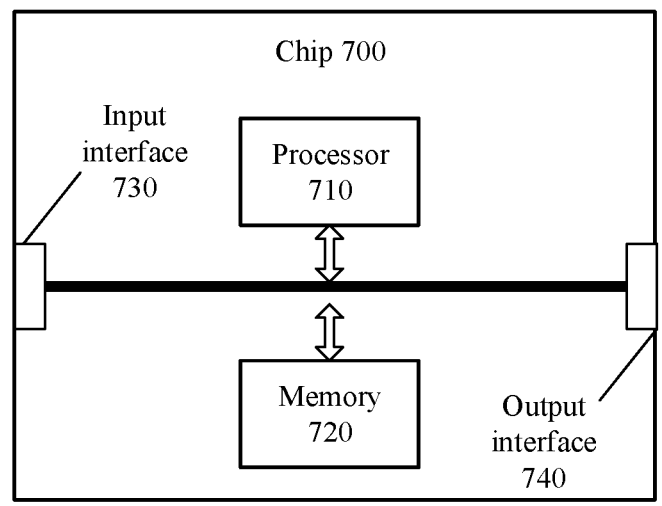
FIG. 13 is a schematic structure diagram of a chip according to another embodiment of the application.

FIG. 13 is a schematic structure diagram of a chip according to another embodiment of the application. The chip 700 shown in FIG. 13 includes a processor 710, and the processor 710 may call and run computer programs in a memory to implement the method in the embodiments of the application.

Optionally, as shown in FIG. 13, the chip 700 may further include the memory 720. The processor 710 may call and run the computer programs in the memory 720 to implement the method in the embodiments of the application.

The memory 720 may be an independent device independent of the processor 710 and may also be integrated into the processor 710.

Optionally, the chip 700 may further include an input interface 730. The processor 710 may control the input interface 730 to communicate with another device or chip, specifically acquiring information or data transmitted by the other device or chip.

Optionally, the chip 700 may further include an output interface 740. The processor 710 may control the output interface 740 to communicate with the other device or chip, specifically outputting information or data transmitted by the other device or chip.

Optionally, the chip may be applied to the network device of the embodiments of the application, and the chip may implement corresponding flows implemented by the network device in each method of the embodiments of the application. For simplicity, elaborations are omitted herein.

Optionally, the chip may be applied to the mobile terminal/terminal device of the embodiment of the application, and the chip may implement corresponding flows implemented by the mobile terminal/terminal device in each method of the embodiment of the application. For simplicity, elaborations are omitted herein.

It is to be understood that the chip mentioned in the embodiment of the application may also be called a system-level chip, a system chip, a chip system or a system on chip, etc.

Figure 14:
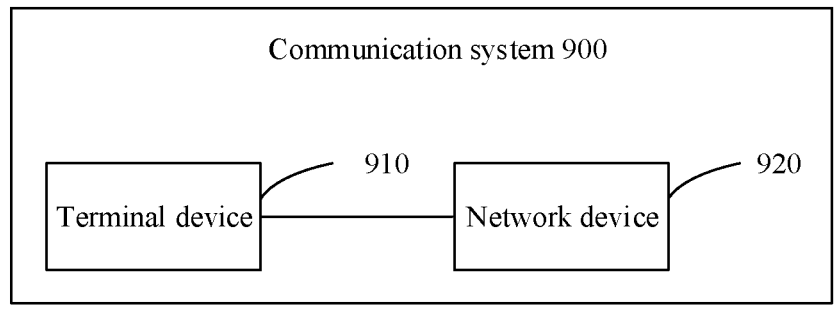
FIG. 14 is a schematic block diagram of a communication system according to an embodiment of the application.

FIG. 14 is a second block diagram of a communication system 900 according to an embodiment of the application. As shown in FIG. 9, a communication system 900 includes a terminal device 910 and a network device 920.

The terminal device 910 may be configured to realize corresponding functions realized by the terminal device in the method, and the network device 920 may be configured to realize corresponding functions realized by the network device in the method. For simplicity, elaborations are omitted herein.

It is to be understood that the processor in the embodiment of the application may be an integrated circuit chip and has a signal processing capacity. In an implementation process, each step of the method embodiments may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the application may be implemented or executed. The universal processor may be a microprocessor or the processor may also be any conventional processor and the like. The steps of the method disclosed in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the method in combination with hardware.

It can be understood that the memory in the embodiment of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the application may also be an SRAM, a DRAM, an SDRAM, a DDR SDRAM, an ESDRAM, an SLDRAM and a DR RAM. That is, the memory in the embodiments of the application is intended to include, but not limited to, memories of these and any other proper types.

The embodiments of the application also provide a computer-readable storage medium, which is configured to store computer programs.

Optionally, the computer-readable storage medium may be applied to a network device in the embodiments of the application, and the computer programs enables a computer to execute corresponding flows implemented by the network device in each method of the embodiments of the application. For simplicity, elaborations are omitted herein.

Optionally, the computer-readable storage medium may be applied to a mobile terminal/terminal device in the embodiments of the application, and the computer programs enables a computer to execute corresponding flows implemented by the mobile terminal/terminal device in each method of the embodiments of the application. For simplicity, elaborations are omitted herein.

The embodiments of the application also provide computer programs product, which includes computer program instructions.

Optionally, the computer programs product may be applied to a network device in the embodiments of the application, and the computer program instructions enables a computer to execute corresponding flows implemented by the network device in each method of the embodiments of the application. For simplicity, elaborations are omitted herein.

Optionally, the computer programs product may be applied to a mobile terminal/terminal device in the embodiments of the application, and the computer program instructions enables the computer to execute corresponding flows implemented by the mobile terminal/terminal device in each method of the embodiments of the application. For simplicity, elaborations are omitted herein.

The embodiments of the application also provide computer programs.

Optionally, the computer programs may be applied to a network device in the embodiments of the application, and the computer programs runs in a computer to enable the computer to execute corresponding flows implemented by the network device in each method of the embodiments of the application. For simplicity, elaborations are omitted herein.

Optionally, the computer programs may be applied to a mobile terminal/terminal device in the embodiments of the application, and the computer programs runs in the computer to enable the computer to execute corresponding flows implemented by the mobile terminal/terminal device in each method of the embodiments of the application. For simplicity, elaborations are omitted herein.

Through the technical solutions, the first indication signal forms the association relationship with the SS, and the terminal device, after receiving the first indication signal, is only required to monitor a downlink control channel in the SS associated with the first indication signal, thereby reducing the power consumption for PDCCH monitoring.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A signal transmission method, comprising:
   transmitting, by a network device, a first indication signal to a terminal device, the first indication signal being used for the terminal device to determine whether to monitor a downlink control channel in a Search Space (SS) associated with the first indication signal;
   wherein the first indication signal forms an association relationship with the SS, and the association relationship between the first indication signal and the SS is used to determine the SS associated with the first indication signal based on the first indication signal;
   wherein the first indication signal is a power saving signal, the downlink control channel is a physical downlink control channel (PDCCH), and an indication of the power saving signal is used for the terminal device to determine whether to monitor the PDCCH in the SS associated with the power saving signal; and
   wherein the association relationship between the first indication signal and the SS comprises at least one of:
   an association relationship between the first indication signal and a slot, where the SS is located, in an SS period in an SS set, wherein the SS set is formed by multiple SSs periodically appeared in time; or an association relationship between the first indication signal and a downlink control channel monitoring symbol in a slot, where an SS is located, in an SS period in an SS set, wherein the SS set is formed by multiple SSs periodically appeared in time, and the first indication signal and the downlink control channel monitoring symbol periodically appear in a time domain.

2. The method of claim 1, wherein the association relationship between the first indication signal and the SS periodically exists in the time domain.

3. The method of claim 2, wherein
   starting time for the association relationship between the first indication signal and the SS in the time domain is configured by the network device; or,
   starting time for the association relationship between the first indication signal and the SS in the time domain is predefined.

4. The method of claim 1, wherein the SS associated with the first indication signal comprises at least one of a common SS or a User Equipment (UE)-specific SS.

5. A signal transmission method, comprising:
   determining, by a terminal device, an association relationship between a first indication signal and a Search Space (SS);
   receiving, by the terminal device, a first indication signal transmitted by a network device; and
   determining, by the terminal device, whether to monitor a downlink control channel in the SS associated with the first indication signal based on the first indication signal;
   wherein the association relationship between the first indication signal and the SS is used to determine the SS associated with the first indication signal based on the first indication signal;
   wherein the first indication signal is a power saving signal, the downlink control channel is a physical downlink control channel (PDCCH), and an indication of the power saving signal is used for the terminal device to determine whether to monitor the PDCCH in the SS associated with the power saving signal; and
   wherein the association relationship between the first indication signal and the SS comprises at least one of:
   an association relationship between the first indication signal and a slot, where the SS is located, in an SS period in an SS set, wherein the SS set is formed by multiple SSs periodically appeared in time; or an association relationship between the first indication signal and a downlink control channel monitoring symbol in a slot, where an SS is located, in an SS period in an SS set, wherein the SS set is formed by multiple SSs periodically appeared in time, and the first indication signal and the downlink control channel monitoring symbol periodically appear in a time domain.

6. The method of claim 5, wherein the association relationship between the first indication signal and the SS periodically exists in the time domain.

7. The method of claim 6, wherein
   starting time for the association relationship between the first indication signal and the SS in the time domain is configured by the network device; or,
   starting time for the association relationship between the first indication signal and the SS in the time domain is predefined.

8. The method of claim 5 wherein the SS associated with the first indication signal comprises at least one of a common SS or a User Equipment (UE)-specific SS.

9. A network device, comprising:
   a transceiver;
   a processor;
   and a memory, wherein the memory is configured to store computer programs, and
   the processor is configured to call and run the computer programs stored in the memory to transmit a first indication signal to a terminal device via the transceiver, the first indication signal is used for the terminal device to determine whether to monitor a downlink control channel in a Search Space (SS) associated with the first indication signal;
   wherein the first indication signal forms an association relationship with the SS, and the association relationship between the first indication signal and the SS is used to determine the SS associated with the first indication signal based on the first indication signal;
   wherein the first indication signal is a power saving signal, the downlink control channel is a physical downlink control channel (PDCCH), and an indication of the power saving signal is used for the terminal device to determine whether to monitor the PDCCH in the SS associated with the power saving signal; and
   wherein the association relationship between the first indication signal and the SS comprises at least one of:
   an association relationship between the first indication signal and a slot, where the SS is located, in an SS period in an SS set, wherein the SS set is formed by multiple SSs periodically appeared in time; or an association relationship between the first indication signal and a downlink control channel monitoring symbol in a slot, where an SS is located, in an SS period in an SS set, wherein the SS set is formed by multiple SSs periodically appeared in time, and the first indication signal and the downlink control channel monitoring symbol periodically appear in a time domain.

10. The network device of claim 9, wherein
the association relationship between the first indication signal and the SS is configured by the network device; or,
the association relationship between the first indication signal and the SS is predefined.

11. The network device of claim 10, wherein in a case that the association relationship between the first indication signal and the SS is configured by the network device, the processor is further configured to call and run the computer programs stored in the memory to transmit, via the transceiver, first configuration information to the terminal device, the first configuration information comprises the association relationship between the first indication signal and the SS.

12. The network device of claim 11, wherein the processor is further configured to call and run the computer programs stored in the memory to transmit, via the transceiver, the first configuration information to the terminal device through a Radio Resource Control (RRC) dedicated signaling or a system broadcast message.

13. A terminal device, comprising:
a transceiver;
a processor; and
a memory for storing computer programs,
wherein the processor is configured to call and run the computer programs stored in the memory to execute the following operations:
determine an association relationship between a first indication signal and a Search Space (SS); and
receive, via the transceiver, a first indication signal transmitted by a network device and determine whether to monitor a downlink control channel in the SS associated with the first indication signal based on the first indication signal;
wherein the association relationship between the first indication signal and the SS is used to determine the SS associated with the first indication signal based on the first indication signal; wherein the first indication signal is a power saving signal, the downlink control channel is a physical downlink control channel (PDCCH), and an indication of the power saving signal is used for the terminal device to determine whether to monitor the PDCCH in the SS associated with the power saving signal; and
wherein the association relationship between the first indication signal and the SS comprises at least one of:
an association relationship between the first indication signal and a slot, where the SS is located, in an SS period in an SS set, wherein the SS set is formed by multiple SSs periodically appeared in time; or an association relationship between the first indication signal and a downlink control channel monitoring symbol in a slot, where an SS is located, in an SS period in an SS set, wherein the SS set is formed by multiple SSs periodically appeared in time, and the first indication signal and the downlink control channel monitoring symbol periodically appear in a time domain.

14. The terminal device of claim 13, wherein
the association relationship between the first indication signal and the SS is configured by the network device; or,
the association relationship between the first indication signal and the SS is predefined.

15. The terminal device of claim 4, wherein in a case that the association relationship between the first indication signal and the SS is configured by the network device,
the processor is further configured to call and run the computer programs stored in the memory to receive, via the transceiver, first configuration information transmitted by the network device, the first configuration information comprises the association relationship between the first indication signal and the SS.

16. The terminal device of claim 15, wherein the processor is further configured to call and run the computer programs stored in the memory to receive, via the transceiver, the first configuration information transmitted by the network device through a Radio Resource Control (RRC) dedicated signaling or a system broadcast message.

* * * * *